United States Patent
Crawford et al.

(10) Patent No.: US 10,712,953 B2
(45) Date of Patent: Jul. 14, 2020

(54) MANAGEMENT OF A DATA WRITTEN VIA A BUS INTERFACE TO A STORAGE CONTROLLER DURING REMOTE COPY OPERATIONS

(71) Applicant: INTERNATIONAL BUSINESS MACHINES CORPORATION, Armonk, NY (US)

(72) Inventors: Joshua J. Crawford, Tucson, AZ (US); David B. Schreiber, Tucson, AZ (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 15/840,160

(22) Filed: Dec. 13, 2017

(65) Prior Publication Data

US 2019/0179545 A1    Jun. 13, 2019

(51) Int. Cl.
*G06F 3/06* (2006.01)
*G06F 13/42* (2006.01)

(52) U.S. Cl.
CPC .......... *G06F 3/0619* (2013.01); *G06F 3/065* (2013.01); *G06F 3/067* (2013.01); *G06F 13/4282* (2013.01)

(58) Field of Classification Search
CPC ........ G06F 3/0619; G06F 3/065; G06F 3/067; G06F 13/4282
See application file for complete search history.

(56) References Cited

U.S. PATENT DOCUMENTS

| | | | |
|---|---|---|---|
| 7,089,385 | B1 | 8/2006 | Kiselev et al. |
| 7,103,796 | B1 * | 9/2006 | Kekre ................. G06F 11/2064 714/5.1 |
| 8,595,455 | B2 | 11/2013 | Chatterjee et al. |
| 8,862,848 | B2 | 10/2014 | Fuente et al. |
| 9,026,696 | B1 | 5/2015 | Natanzon et al. |
| 9,250,832 | B2 | 2/2016 | Sheffield et al. |
| 9,389,799 | B2 | 7/2016 | Brown et al. |
| 9,483,366 | B2 | 11/2016 | Brown et al. |

(Continued)

OTHER PUBLICATIONS

Kim et al.; "A Dynamic Bitmap For Huge File System In SANs", Recent Advances In Computers, Computing And Communications, WSEAS Press, 2002, pp. 229-234.

(Continued)

*Primary Examiner* — Reginald G Bragdon
*Assistant Examiner* — Edward Wang
(74) *Attorney, Agent, or Firm* — Rabindranath Dutta; Konrad Raynes Davda & Victor

(57) ABSTRACT

A synchronization of data is performed via remote copy operations from a primary storage controller to a secondary storage controller, wherein input/output (I/O) requests are received at the primary storage controller from a host both via a bus interface and a network interface while the remote copy operations are in progress. A first data structure stores identification of tracks written via the network interface that are to be copied from the primary storage controller to the secondary storage controller for the synchronization of data. A second data structure stores identification of tracks written via the bus interface that are to be copied from the primary storage controller to the secondary storage controller for the synchronization of data.

24 Claims, 10 Drawing Sheets

(56) References Cited

U.S. PATENT DOCUMENTS

| | | | |
|---|---|---|---|
| 9,535,610 | B2 | 1/2017 | Benhase et al. |
| 9,601,151 | B1 | 3/2017 | Crawford et al. |
| 2003/0158869 | A1 | 8/2003 | Micka |
| 2007/0220223 | A1 | 9/2007 | Boyd et al. |
| 2015/0178201 | A1 | 6/2015 | Sampathkumar et al. |
| 2015/0286538 | A1 | 10/2015 | Brown et al. |
| 2016/0026403 | A1 | 1/2016 | Benhase et al. |
| 2016/0203172 | A1 | 7/2016 | Attaluri et al. |
| 2017/0235805 | A1 | 8/2017 | Shetty et al. |

OTHER PUBLICATIONS

Hirofuchi et al.; "A WAN-Optimized Live Storage Migration . . . Disasters", IEICE Transactions On Information And Systems, vol. E96, No. 12, Dec. 1, 2013, pp. 2663-2674.
Agrawal et al.; "Emulating Goliath Storage Systems With David", ACM Transactions On Storage, vol. 7, Issue 4, Jan. 1, 2012, pp. 1-14.
Roh et al.; "B+-Tree Index Optimization By . . . Flash-Based Solid State Drives", VLDB Endowment, 38th Inter. Conf. On, vol. 5, No. 4, Aug. 27-31, 2012, pp. 286-297.
PCT International Search Report dated Mar. 20, 2019, pp. 9, for Application Serial No. PCTIB2018/059926, filed Dec. 12, 2018.
Hirofuchi et al.; "A WAN-Optimized Live Storage Migration Mechanism toward Virtual Machine Evacuation upon Severe Disasters", IEICE Transactions On Information And Systems, vol. E96, No. 12, Dec. 1, 2013, pp. 2663-2674.
Roh et al.; "B+-Tree Index Optimization By Exploiting Internal Parallelism of Flash-Based Solid State Drives", VLDB Endowment, 38th Inter. Conf. On, vol. 5, No. 4, Aug. 27-31, 2012, pp. 286-297.

\* cited by examiner

MANAGEMENT OF A DATA WRITTEN VIA A BUS INTERFACE TO A STORAGE CONTROLLER DURING REMOTE COPY OPERATIONS

BACKGROUND

1. Field

Embodiments relate to the management of data written via a bus interface to a storage controller during remote copy operations.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

In many systems, data may be copied from one storage controller to another storage controller and such copying of data may be referred to as remote copy. The storage controller from which data is copied may be referred to a as a primary storage controller and the storage controller which data is copied may be referred to as a secondary storage controller. One or more storage volumes may be copied from the primary storage controller to the secondary storage controller, where a storage volume may include a plurality of tracks. The copying may comprise mirroring of storage volumes between the primary storage controller and the secondary storage controller for data replication.

Certain mirroring mechanisms may control the formation of consistency groups for data consistency. A consistency group is a collection of volumes across multiple storage units that are managed together when creating consistent copies of data. The order of dependent writes is preserved in consistency groups. The formation of these consistency groups may be controlled by a primary storage controller which sends commands over remote copy processes and copy volumes to the secondary storage controller.

An out of synchronization (OOS) bitmap identifies which tracks involved in a remote copy relationship have not yet been copied over and are thus protected tracks. Each track is represented by one bit in the bitmap. A bit is set when the corresponding track is to be copied. The bit is reset (i.e., unset) when the corresponding track has been copied from the primary storage controller to the secondary storage controller.

When consistent copies are to be performed between the primary storage controller and the secondary storage controller, a Change Recording (CR) bitmap may be maintained. The CR bitmap has a bit for every track on the source storage volume. When there is a write on a track of the source storage volume after the remote copy relationship has been established for a current consistency group, then a bit is set in the CR bitmap to indicate that the track needs to be copied in the subsequent remote copy for the next consistency group.

U.S. Patent Publication 2016/0203172 discusses a method and system for providing hardware for a bitmap data structure for efficient storage of heterogeneous lists. U.S. Patent Publication 2003/0158869A1 discusses a method and system for providing incremental update control for remote copy. U.S. Pat. No. 9,483,366 discusses a system and method for providing bitmap selection for remote copying of updates. U.S. Pat. No. 9,250,832 discuses a method and system for providing a bitmap to synchronize firmware operations with fast-path hardware input/output (I/O) processing. U.S. Pat. No. 9,026,696 discusses a system and method for using I/O track information for continuous push with splitter for a storage device. U.S. Pat. No. 8,862,848 discusses a method and system for providing data storage using bitmaps. U.S. Pat. No. 8,595,455 discusses a method and system for maintaining data consistency in mirrored cluster storage systems using bitmap write-intent logging. U.S. Pat. No. 7,089,385 discusses a method and system for tracking in-progress writes through use of multi-column bitmaps.

Additionally, U.S. Patent publication 2017/0235805A1 discusses a method and system for providing a tracking structure for data replication synchronization. U.S. Patent publication 2015/0178201 discusses a method and system for providing efficient caching of swap I/O and/or similar I/O pattern. U.S. Pat. No. 9,601,151 discusses a method and system for reducing data storage system I/O bandwidth via read-once point in time copy. U.S. Pat. No. 9,535,610 discusses a method and system for optimizing peer-to-peer remote copy (PPRC) transfers for partial write operations using a modified sectors bitmap.

SUMMARY OF THE PREFERRED EMBODIMENTS

Provided are a method, system, and computer program product in which a synchronization of data is performed via remote copy operations from a primary storage controller to a secondary storage controller, wherein input/output (I/O) requests are received at the primary storage controller from a host both via a bus interface and a network interface while the remote copy operations are in progress. A first data structure stores identification of tracks written via the network interface that are to be copied from the primary storage controller to the secondary storage controller for the synchronization of data. A second data structure stores identification of tracks written via the bus interface that are to be copied from the primary storage controller to the secondary storage controller for the synchronization of data. As a result, contention between remote copy operations and processes that write via the bus interface are reduced.

In certain embodiments, the second data structure identifies tracks reserved by a syncio process that is used to perform writes via the bus interface. As a result, contention caused by the syncio process with remote copy operations are reduced.

In further embodiments, operations for the synchronization of data are initially performed to copy tracks from the primary storage controller to the secondary storage controller by using the first data structure without considering the second data structure. As a result, alternations to existing remote copy mechanisms are avoided.

In yet further embodiments, in response to determining that the syncio process has released the tracks identified in the second data structure, the second data structure is copied to the first data structure and then the synchronization of data is completed by using the first data structure. As a result, syncio processes are integrated in a primary storage controller without significantly impacting the performance of existing copy operations.

In certain embodiments, a syncio process is used to perform writes via the bus interface, wherein the syncio process allows the host to hold an application thread in a spin loop waiting for a write operation to complete, and wherein the syncio process reserves tracks for performing writes for a greater duration of time prior to performing the writes on the tracks in comparison to other processes that perform writes on the tracks via the network interface. As a result of the embodiments, writes reserved by the syncio process do not significantly affect the performance of existing copy operations.

In further embodiments, the first data structure is a standard out of synchronization bitmap and the second data structure is a syncio out of synchronization bitmap. As a result, existing data structures are reused and analogous data structures are created for syncio operations.

In additional embodiments, a syncio process writes by using the bus interface, wherein the remote copy operations are performed in a mirroring process, wherein the first data structure is a standard out of synchronization (OOS) bitmap, and wherein the second data structure is a syncio OOS bitmap. A syncio change recording (CR) bitmap stores indications of writes via the syncio process while a current consistency group is being copied from the primary storage controller to the secondary storage controller by using the standard OOS bitmap. A standard CR bitmap stores indications of writes via non syncio processes while the current consistency group is being copied from the primary storage controller to the secondary storage controller by using the standard OOS bitmap. As a result, contention between the syncio process and the mirroring process is reduced.

In further embodiments, in response to the syncio process releasing tracks indicated in the syncio CR bitmap, the syncio CR bitmap is merged with the standard CR bitmap to use for copying of the next consistency group. As a result, existing mechanisms for global mirror are integrated with syncio.

BRIEF DESCRIPTION OF THE DRAWINGS

Referring now to the drawings in which like reference numbers represent corresponding parts throughout.

DETAILED DESCRIPTION

Figure 1:
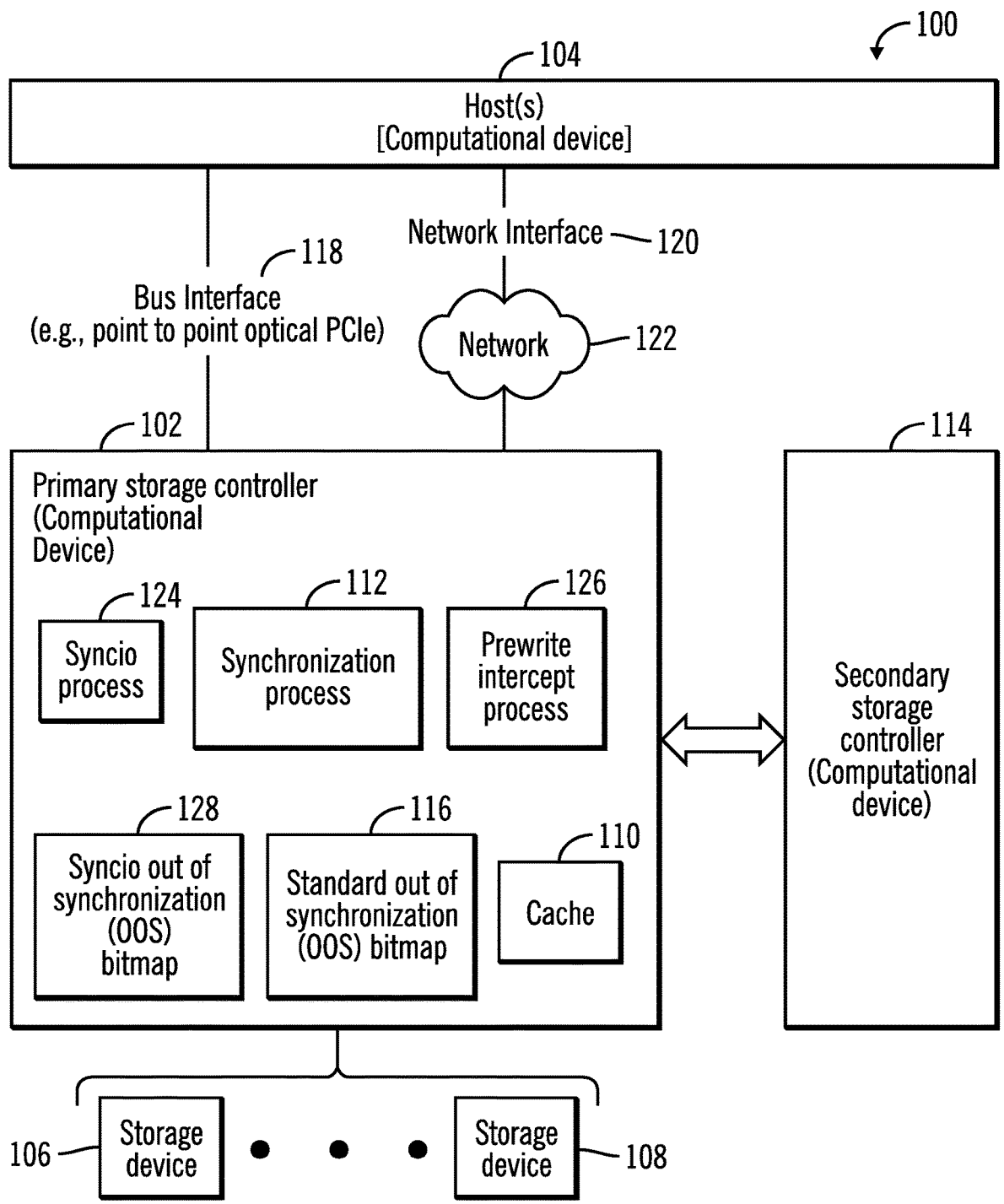
FIG. 1 illustrates a block diagram of a computing environment comprising a primary storage controller coupled to one or more hosts and one or more storage devices, where syncio based writes occur from the one or more hosts to the primary storage controller, in accordance with certain embodiments.

In the following description, reference is made to the accompanying drawings which form a part hereof and which illustrate several embodiments. It is understood that other embodiments may be utilized and structural and operational changes may be made.

Syncio (also referred to as sync I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt. Syncio operations may be performed by a syncio process and may correspond to a high speed data transfer process from a host to a primary storage controller.

Due to its strict performance requirements, a syncio process violates a standard rule of one pre-write intercept call for each write, as is found in previous mechanisms for performing writes in a storage controller. A syncio process may call pre-write intercept once for a track and then write that track multiple times. Current mechanisms for pre-write intercept sets bits in either an OOS bitmap (referred to as standard OOS bitmap) or a CR bitmap (referred to as standard CR bitmap). Synchronization mechanisms use the OOS bitmap to determine which tracks to copy from the primary storage controller to the secondary storage controller. The syncio process reserves track access for the fast writes performed by the syncio process and may hold the reserved track access to its group of tracks for a long time. If syncio process gets to the point of setting an OOS bit for one of these tracks then the copying of the storage volume corresponding the set OOS bit is held up until the syncio process releases that track access and this may take a relatively long time. This impacts the ability to synchronize volumes to the secondary storage controller in a timely manner.

In certain embodiments, a special data structure (referred to as a syncio OOS bitmap) is provided by the storage controller to identify the tracks being reserved by the syncio process for writing, and synchronization operations use a standard OOS bitmap to perform the synchronization of data without considering the tracks identified in the syncio OOS bitmap until the synchronization operations are complete. This provides the syncio process time to complete its operations. Subsequently, as the syncio process releases the reserved tracks, bits are copied from the syncio OOS bitmap to the standard OOS bitmap, and the standard OOS bitmap is used for completing the synchronization of data.

Exemplary Embodiments

FIG. 1 illustrates a block diagram of a computing environment 100 comprising a primary storage controller 102 coupled to one or more hosts 104 and one or more storage devices 106, 108, where syncio based writes occur from the one or more hosts 104 to the primary storage controller 102, in accordance with certain embodiments.

The primary storage controller 102 allows the one or more hosts 104 to perform input/output (I/O) operations with logical storage maintained by the primary storage controller 102. The physical storage corresponding to the logical storage may be found in one or more of the storage devices 106, 108 and/or a cache 110 of the primary storage controller 102.

A synchronization process 112 that executes in the primary storage controller 102 may perform copy operations to copy tracks of storage volumes from the primary storage controller 102 to a secondary storage controller 114. The synchronization process 112 may be referred to as performing remote copy operations, i.e., copy operations to copy tracks of storage volumes from one storage controller to another storage controller. In certain embodiments the synchronization process 112 may be implemented in software, firmware, hardware or any combination thereof. The synchronization process 112 uses a standard OOS bitmap 116 that indicates tracks to be copied from the primary storage controller 102 to the secondary storage controller 114. Each bit of the standard OOS bitmap corresponds to a track of a storage volume. If a bit is set (i.e., is assigned to 1) then the corresponding track is to be copied from the primary storage controller 102 to the secondary storage controller 114 for data synchronization. If a bit is not set (i.e., unset or reset and is assigned to 0) then the corresponding track does not have to be copied from the primary storage controller 102 to the secondary storage controller 114 for data synchronization.

The primary storage controller 102, the secondary storage controller 114, and the one or more hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The primary storage controller 102, the secondary storage controller 114 and the one or more hosts 104 may be elements in any suitable network, such as, a storage area network, a wide area network, the Internet, an intranet. In certain embodiments, primary storage controller 102, the secondary storage controller 114, and the one or more hosts 104 may be elements in a cloud computing environment.

In certain embodiments, a host 104 may be coupled to the primary storage controller 102 via a bus interface [e.g., a point to point optical Peripheral Component Interconnect Express (PCIe) interface] 118 and a network interface 120. Syncio operations from the host 104 may be performed over the bus interface 118. Traditional I/O operations from the host 104 may be performed over the network interface 120. The bus interface 118 may comprise a faster access channel for I/O than the network interface 120. Additional bus interface technology to extend the bus interface 118 may be utilized, including PCIe extender cables or components, such as a distributed PCIe switch, to allow PCIe over Ethernet, such as with the ExpEther technology. The network interface 120 may couple the host 104 via a network adapter to a network 122 that includes the primary storage controller 102.

The primary storage controller 102 includes a syncio process 124 that allows the performing of syncio based writes from the hosts 104 to the primary storage controller 102. In certain embodiments the syncio process 124 may be implemented in software, firmware, hardware or any combination thereof.

In certain embodiments, a prewrite intercept process 126 implemented in software, firmware, hardware or any combination thereof executes in the primary storage controller 102. For performing a write to a track, processes call the prewrite intercept process 126 and then write to the track. When the prewrite intercept process is 126 is called by a process the track is reserved for the process.

Processes other than the syncio process 124 call the prewrite intercept process 126 and then quickly write to the track only once and then the track is released. However, the syncio process 124 may call the prewrite intercept process 126 well in advance of the first write by the syncio process 124 to the track. Furthermore, after calling the prewrite intercept process 126, the syncio process 124 may perform multiple writes to the track. Therefore, the syncio process 124 may reserve a track for a considerable amount of time without writing to the track or may reserve a track for a considerable amount of time by performing multiple writes to the track. Thus, the syncio process 124 may reserve a track in anticipation of writing to the track but not actually write to the track immediately after reserving the track.

In previous mechanisms, when a syncio process 124 reserves a track by calling the prewrite intercept process 126, the synchronization process 112 is unable to copy any track of the storage volume on which the reserved track is located, until the reserved track is released by the syncio process 124. Thus the writes performed by the syncio process 124 interferes with the efficient operation of the synchronization process 112.

In certain embodiments, to avoid the interference caused by writes performed by the syncio process 124 on the efficient operation of the synchronization process 112, a syncio OOS bitmap 128 is maintained in the primary storage controller 102. The syncio OOS bitmap 128 has a bit for every track, and those tracks that are written to by the syncio process 124 are set (i.e., assigned to 1), and corresponding bits for these tracks are unset (i.e., assigned to 0) in the standard OOS bitmap 116.

Once the syncio process 124 releases a track in the syncio OOS bitmap 128 then the corresponding bit is unset in the syncio OOS bitmap 128 and the bit corresponding to the track is set in the standard OOS bitmap 116. Then the synchronization process 112 copies the track from the primary storage controller 102 to the secondary storage controller 114.

Therefore, FIG. 1 illustrates certain embodiments in which by maintaining a syncio OOS bitmap 128 that indicates tracks of a storage volume to which the syncio process 124 may write, the synchronization process 112 can operate efficiently and is able to synchronize tracks of the storage volume from the primary storage controller 102 to the secondary storage controller 114.

Figure 2:
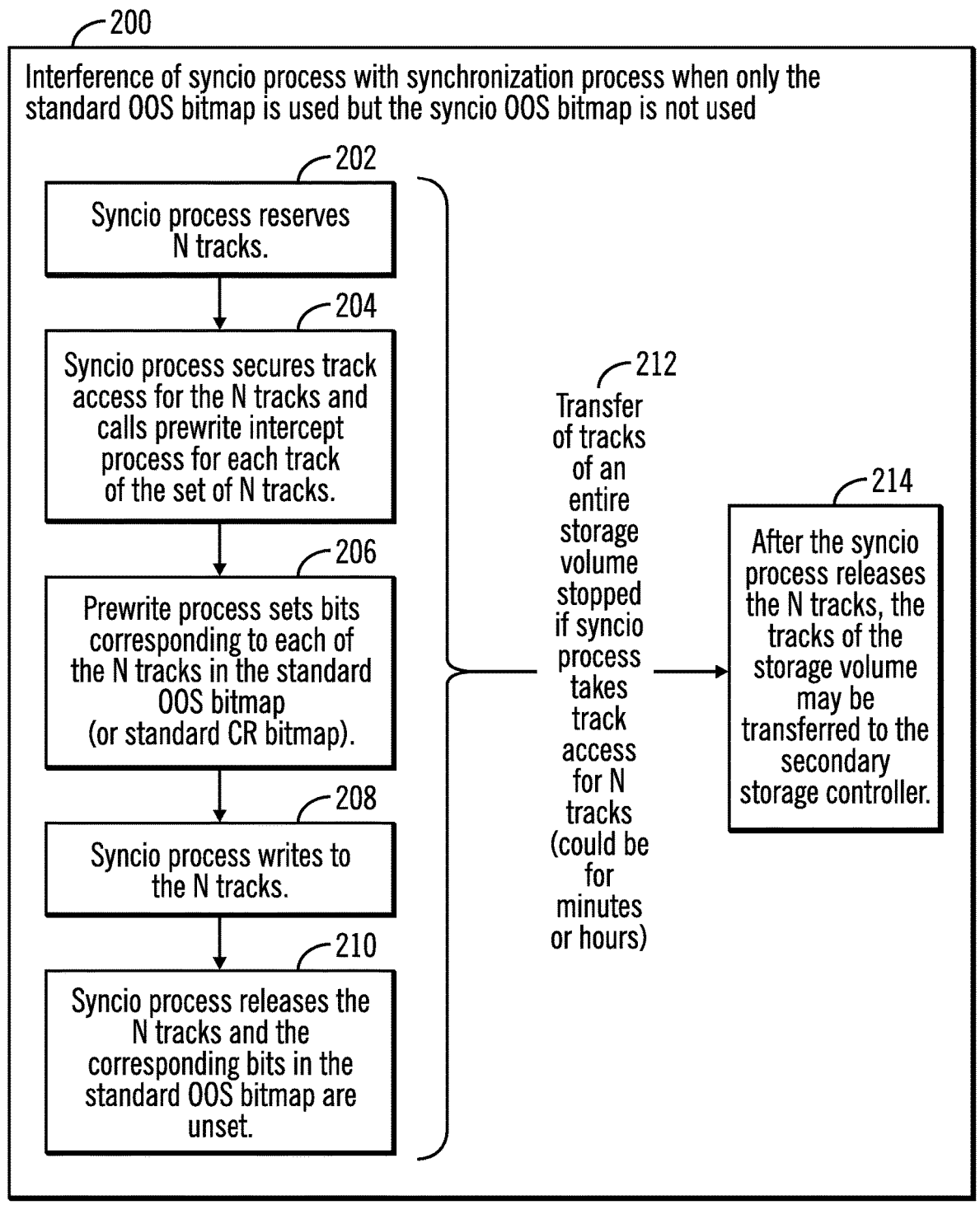
FIG. 2 illustrates a flowchart that shows the interference of a syncio process with a synchronization process when only a standard out of synchronization (OOS) bitmap is used but a syncio OOS bitmap is not used, in accordance with certain embodiments.

FIG. 2 illustrates a flowchart 200 that shows the interference of the syncio process with the synchronization process when only the standard OOS bitmap 116 is used but the syncio OOS bitmap 128 is not used, in accordance with certain embodiments. The operations shown in the flowchart of FIG. 2 may be performed in the primary storage controller 102.

Control starts at block 202 in which a syncio process 124 reserves N tracks, where N is a number that may be one or more. For example, in certain embodiments N may be 10. The syncio process 124 secures track access for the N tracks and calls (at block 204) the prewrite intercept process 126 for each track of set of N tracks. The prewrite intercept process 126 sets (at block 206) the bits corresponding to each of the N tracks in the standard OOS bitmap 116 (or in a standard CR bitmap).

From block 206 control proceeds to block 208 in which the syncio process 124 writes to the N tracks. This writing may take place after a considerable period of time or may continue for a considerable period of time, where in certain embodiments the considerable period of time may be over 10 seconds and could even extend to minutes or hours. Subsequent to completion of the writes to the N tracks, the syncio process 124 releases (at block 210) the N tracks and unsets the corresponding bits in the standard OOS bitmap 116.

In FIG. 2, reference numeral 212 shows that the transfer of all tracks of an entire storage volume from the primary storage controller 102 to the secondary storage controller 114 by the synchronization process 112 is stopped if the syncio process 124 takes track access for N tracks of the storage volume at block 202. Until the syncio process 124 releases the N tracks (at block 210), the N tracks or any other track of the storage volume are not transferred to the secondary storage controller 114. After the syncio process 124 releases the N tracks, the tracks of the storage volume may be transferred to the secondary storage controller (as shown via reference numeral 214). Thus, for the time between the reservation and the release of the N tracks by the syncio process 124, the synchronization process 112 is unable to perform remote copy operations on any track of the storage volume on which the N tracks are located.

Figure 3:
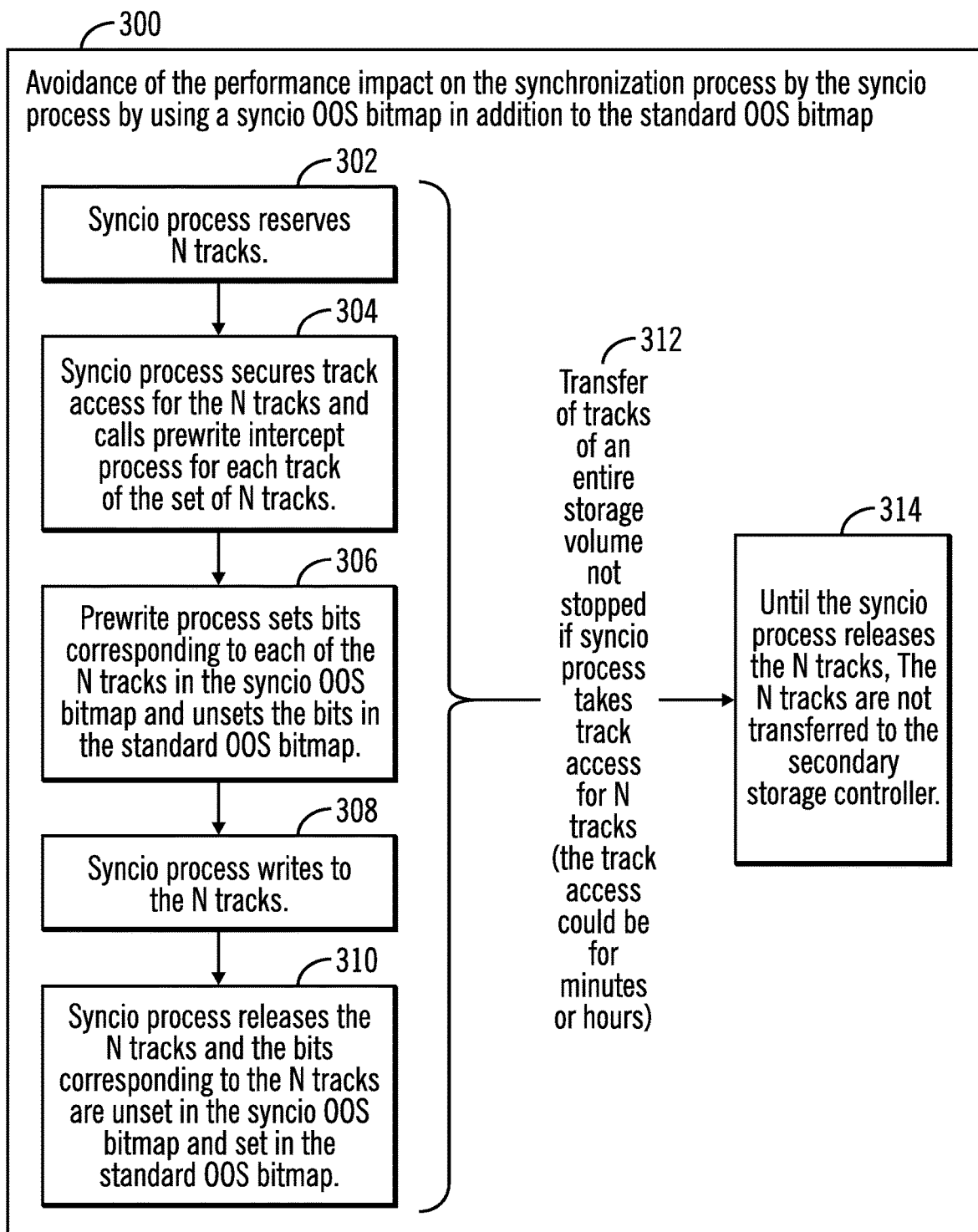
FIG. 3 illustrates a flowchart that shows the avoidance of the performance impact on the synchronization process by the syncio process by using a syncio OOS bitmap in addition to the standard OOS bitmap, in accordance with certain embodiments.

FIG. 3 illustrates a flowchart 300 that shows the avoidance of the performance impact on the synchronization process 112 by the syncio process 124 by using a syncio OOS bitmap 128 in addition to the standard OOS bitmap 116, in accordance with certain embodiments. The operations shown in the flowchart of FIG. 3 may be performed in the primary storage controller 102.

Control starts at block 302 in which a syncio process 124 reserves N tracks, where N is a number that may be one or more. For example, in certain embodiments N may be 10. The syncio process 124 secures track access for the N tracks and calls (at block 304) the prewrite intercept process 126 for each track of set of N tracks. The prewrite intercept process 126 sets (at block 306) the bits corresponding to each of the N tracks in the syncio OOS bitmap 128 and unsets the bits in the standard OOS bitmap 116.

From block 306 control proceeds to block 308 in which the syncio process 124 writes to the N tracks. This writing may take place after a considerable period of time or may continue for a considerable period of time, where in certain embodiments the considerable period of time may be over 10 seconds and could even extend to minutes or hours. Subsequent to completion of the writes to the N tracks, the syncio process 124 releases (at block 310) the N tracks and the bits corresponding to the N tracks are unset in the syncio OOS bitmap 128 and set in the standard OOS bitmap 116.

In FIG. 3, reference numeral 312 shows that the transfer of tracks of an entire storage volume from the primary storage controller 102 to the secondary storage controller 114 by the synchronization process 112 is not stopped if the syncio process 124 takes track access for N tracks of the storage volume at block 302. Other tracks besides the N tracks may be processed by the synchronization process as the bits corresponding to the N tracks are not set in the standard OOS bitmap 116. However, until the syncio process 124 releases the N tracks (at block 310), the N tracks are not transferred to the secondary storage controller 114 (as shown via reference numeral 314). Thus, for the time between the reservation and release of the N tracks by the syncio process 124, the synchronization process 112 is able to perform remote copy operations on any track (other than the N tracks) of the storage volume on which the N tracks are located.

Figure 4:
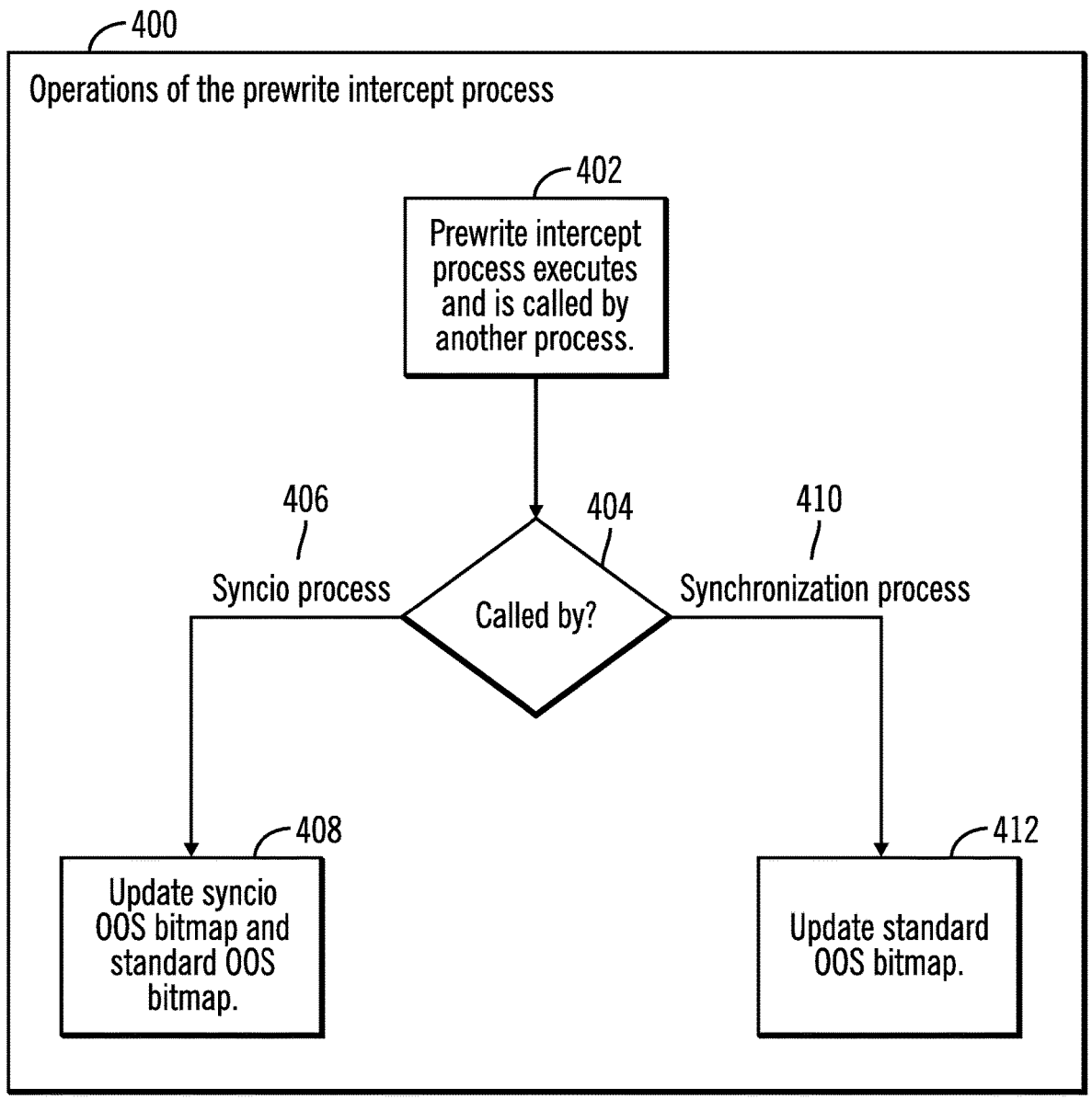
FIG. 4 illustrates a flowchart that shows operations performed by a prewrite intercept process, in accordance with certain embodiments.

FIG. 4 illustrates a flowchart 400 that shows operations performed by the prewrite intercept process 126, in accordance with certain embodiments. The operations shown in the flowchart of FIG. 4 may be performed in the primary storage controller 102.

Control starts at block 402 in which the prewrite intercept process 126 executes and is called by another process. The prewrite intercept process 126 determines (at block 404) which process has made the call. If the prewrite intercept process 126 has been called the syncio process 126 (as shown via branch 406) then the prewrite intercept process 126 updates the syncio OOS bitmap 128 and the standard OOS bitmap 116 as shown via reference numeral 408, where the updates are in accordance with operations shown in block 306 of FIG. 3.

If the prewrite intercept process 126 has been called the synchronization process 112 (as shown via branch 410) then the prewrite intercept process 126 updates the standard OOS bitmap 116 as shown via reference numeral 412, where the updates set bits corresponding to tracks in the standard OOS bitmap 116 corresponding to writes requested to be performed on the tracks by non syncio processes.

Therefore, FIGS. 1-4 illustrate certain embodiments in which the performance of the synchronization process 112 is improved over existing mechanisms by using a syncio OOS bitmap 128 corresponding to a syncio process 124 in addition to the standard OOS bitmap 116.

Figure 5:
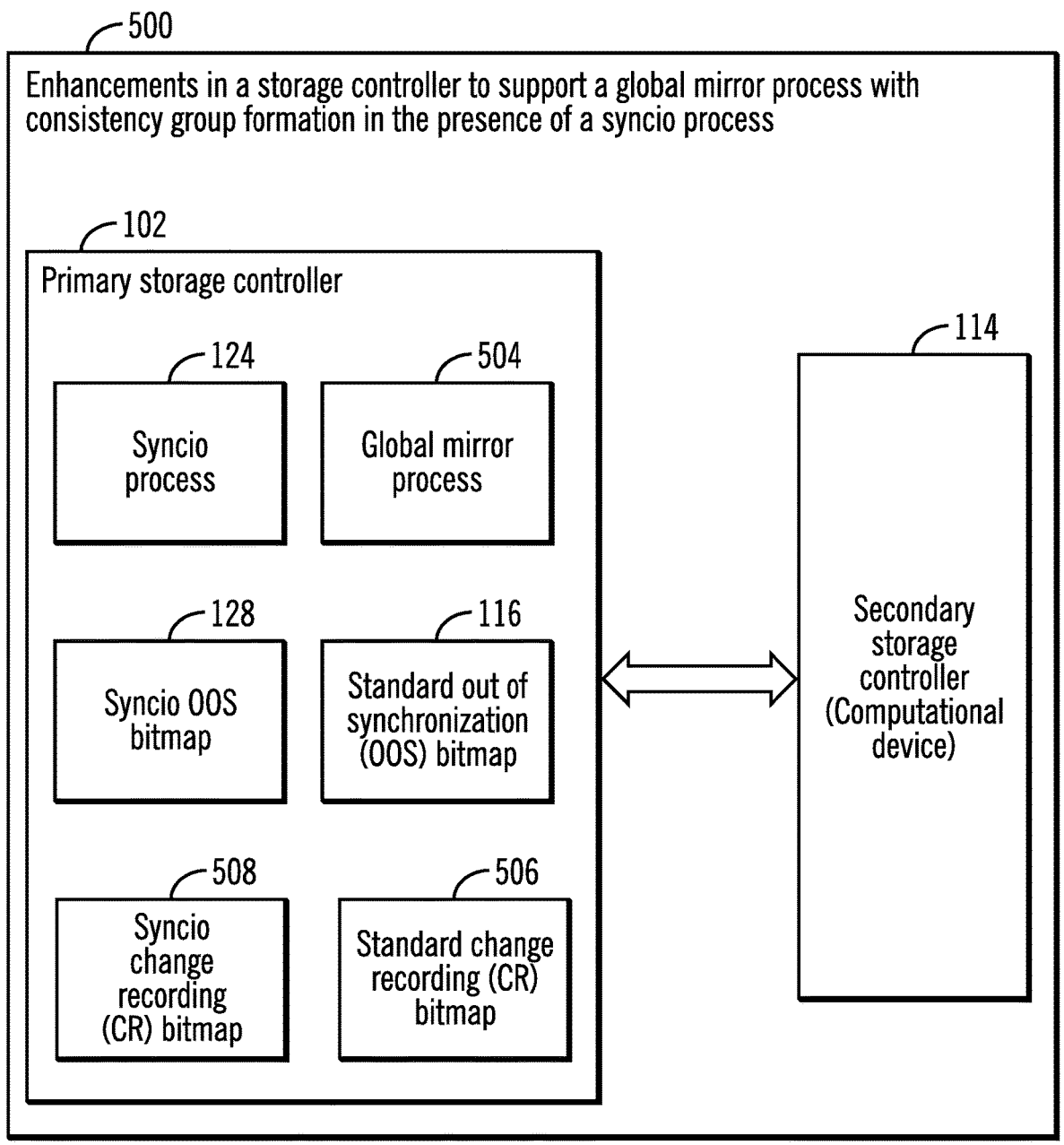
FIG. 5 illustrates a block diagram that shows enhancements in a primary storage controller to support a global mirror process that support consistent copying of data from the primary storage controller to the secondary storage controller in the presence of a syncio process, in accordance with certain embodiments.

FIG. 5 illustrates a block diagram 500 certain embodiments that show the enhancements in a primary storage controller 102 to support a global mirror process (mirroring process) 504 that support consistent copying of data from the primary storage controller 102 to the secondary storage controller 114 in the presence of a syncio process 124. The operations shown in FIG. 5 may be performed in the primary storage controller 102.

In FIG. 5, the primary storage controller 102 includes a global mirror process 504 that executes in the primary storage controller 102. In existing mechanisms without syncio processes, the global mirror process 504 copies data consistently from the primary storage controller 102 to the secondary storage controller 114. To perform the consistent copying of data in addition to the standard OOS bitmap 116 a standard change recording (CR) bitmap 506 is maintained in the primary storage controller 102. In existing mechanisms the standard OOS bitmap 116 indicates the tracks to be copied for the current consistency group, and the standard CR bitmap 506 indicates the tracks to be copied for the next consistency group. In existing mechanisms when new writes on tracks are received when the current consistency group is being copied by using the standard OOS bitmap 116, then bits corresponding to these tracks are set in the standard CR bitmap 506 as these tracks will be in the next consistency group to be copied over the secondary storage controller 114. When the current consistency group is copied over, then the standard CR bitmap 506 is switched into the standard OOS bitmap 116 for copying the next consistency group that was being stored in the standard CR bitmap 506.

However, in the presence of the syncio process 124 the existing mechanism create problems as syncio based writes may cause a performance impact for the same reasons that the synchronization process was impacted in embodiments shown in FIGS. 1-4. To avoid such a performance impact, a syncio CR bitmap 508 that indicates tracks written by syncio process 124 for the next consistency group is maintained. The standard CR bitmap 506 continues to indicate tracks written by non syncio processes.

In certain embodiments, when the syncio process 124 releases the tracks that are indicated as being written by the syncio process 124 in the syncio CR bitmap 508, the syncio CR bitmap 508 is merged with the standard CR bitmap 506 for copying data for the next consistency group by the global mirror process 504.

Therefore, FIG. 5 illustrates certain embodiments in which for a global mirror process to operate efficiently in the presence of a syncio process 124, a syncio CR bitmap 508 is maintained to indicate tracks written by the syncio process 124 while the current consistency group is being copied.

Figure 6:
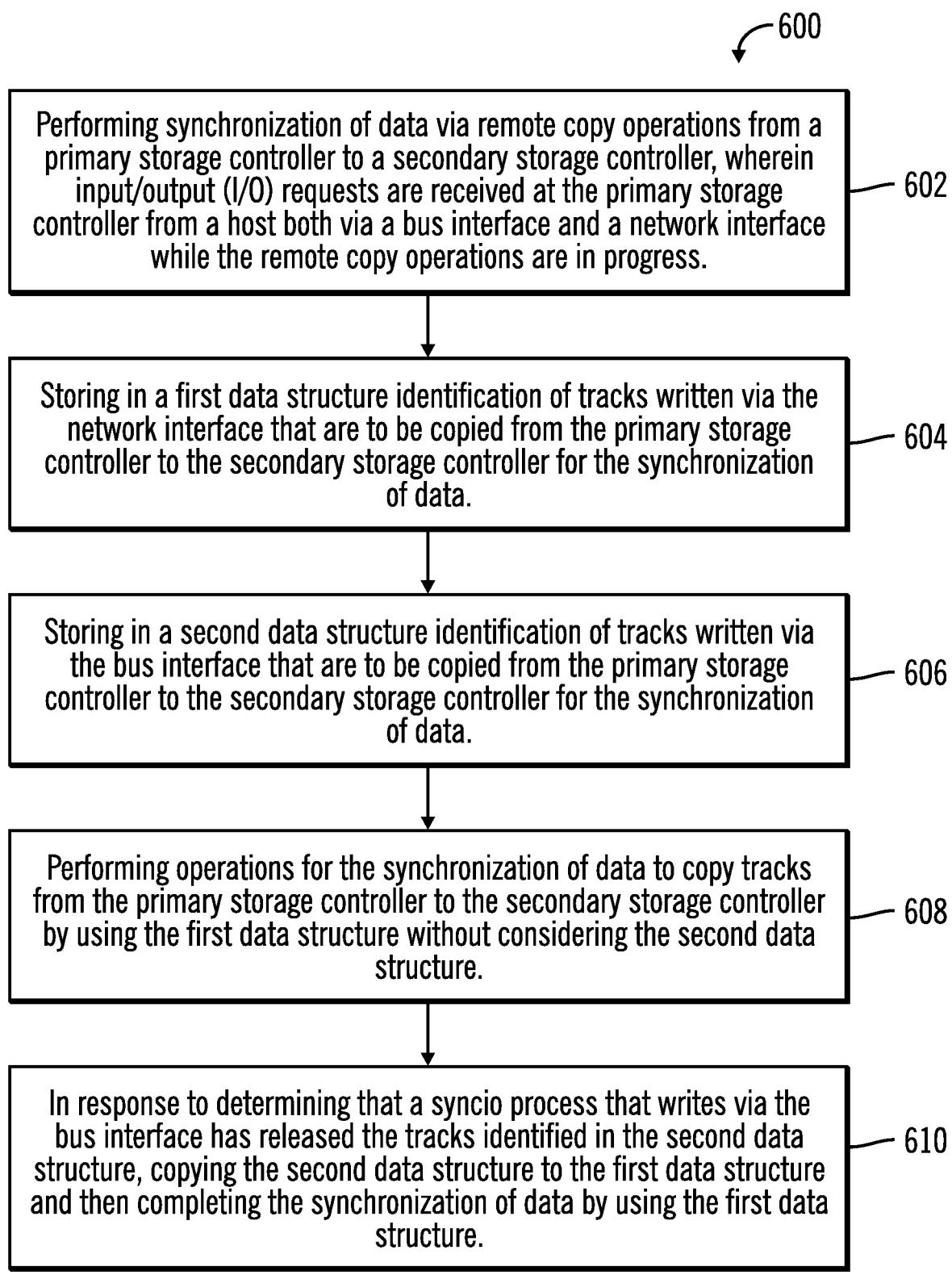
FIG. 6 illustrates a flowchart that shows operations to reduce contention between a syncio process and a synchronization process, in accordance with certain embodiments.

FIG. 6 illustrates a flowchart 600 that shows operations to reduce contention between a syncio process and a synchronization process, in accordance with certain embodiments. The operations shown in FIG. 6 may be performed in the primary storage controller 102.

Control starts at block 602 in which a synchronization of data is performed via remote copy operations from a primary storage controller 102 to a secondary storage controller 114, wherein input/output (I/O) requests are received at the primary storage controller 102 from a host 104 both via a bus interface 118 and a network interface 120 while the remote copy operations are in progress. A first data structure 116 (e.g. OOS bitmap 116) stores (at block 604) identification of tracks written via the network interface 120 that are to be copied from the primary storage controller 102 to the secondary storage controller 114 for the synchronization of data. A second data structure 128 (e.g., syncio OOS bitmap 128) stores (at block 606) identification of tracks written via the bus interface 118 that are to be copied from the primary storage controller 102 to the secondary storage controller 114 for the synchronization of data. In certain embodiments, the second data structure 128 identifies tracks reserved by a syncio process 124 that is used to perform writes via the bus interface 118.

From block 606 control proceeds to block 610 in which operations for the synchronization of data is initially performed to copy tracks from the primary storage controller 102 to the secondary storage controller 114 by using the first data structure 116 without considering the second data structure 128. In response to determining that the syncio process 124 has released the tracks identified in the second data structure 128, the second data structure is copied to the first data structure and the synchronization of data is completed by using the first data structure.

Figure 7:
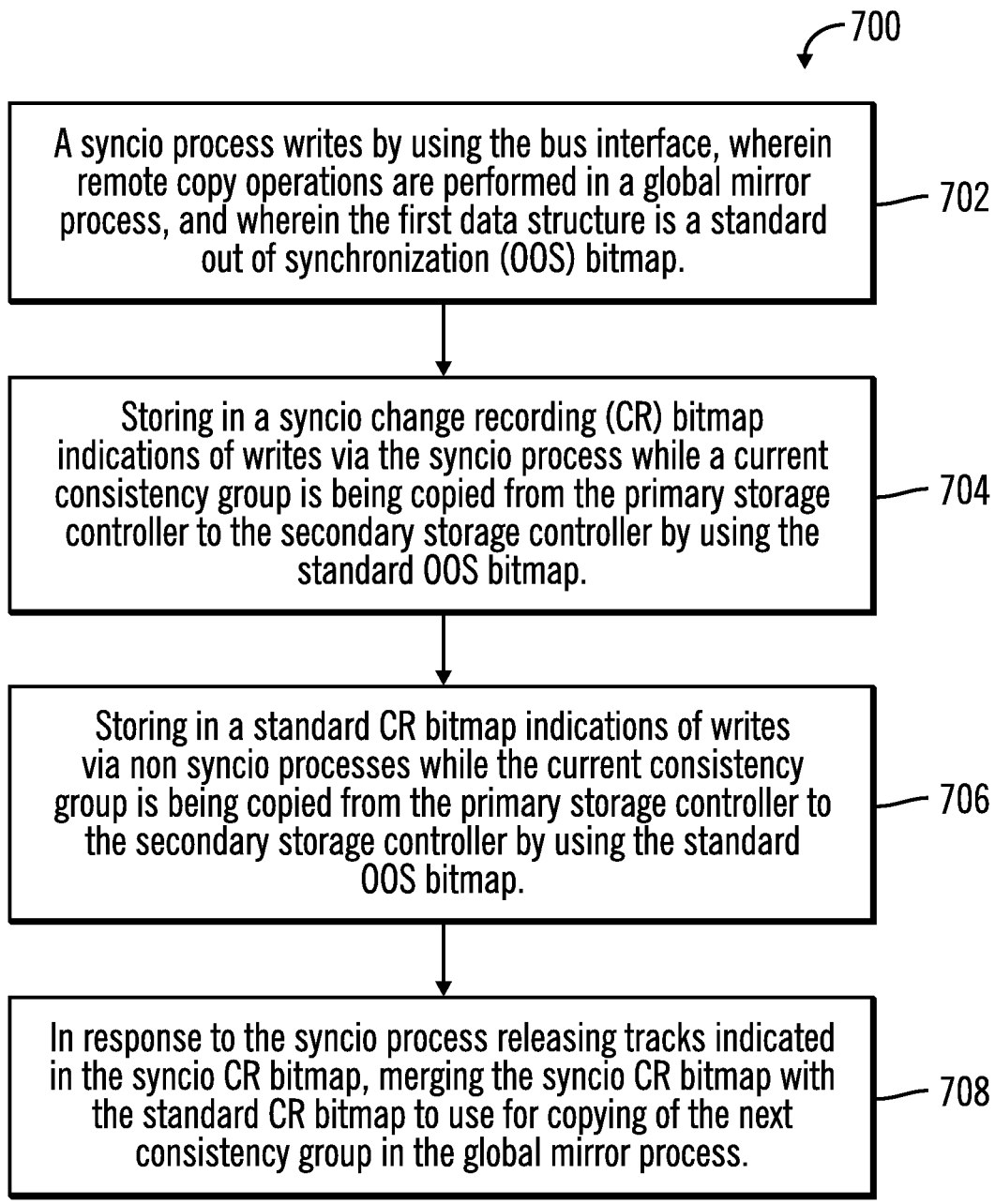
FIG. 7 illustrates a flowchart that shows operations to reduce contention between a syncio process and a global mirror process, in accordance with certain embodiments.

FIG. 7 illustrates a flowchart 700 that shows operations to reduce contention between a syncio process 124 and a global mirror process 504, in accordance with certain embodiments. The operations shown in FIG. 6 may be performed in the primary storage controller 102.

Control starts at block 702 in which a syncio process 124 writes by using the bus interface 118, wherein remote copy operations are performed in a global mirror process 504, wherein the first data structure 116 is a standard out of synchronization (OOS) bitmap, and wherein the second data structure 128 is a syncio OOS bitmap. A syncio change recording (CR) bitmap 508 stores (at block 704) indications of writes via the syncio process 124 while a current consistency group is being copied from the primary storage controller 102 to the secondary storage controller 114 by using the standard OOS bitmap 116. A standard CR bitmap 506 stores (at block 706) indications of writes via non syncio processes while the current consistency group is being copied from the primary storage controller 102 to the secondary storage controller 114 by using the standard OOS bitmap 116.

From block 706 control proceeds to block 708 in which in response to the syncio process 124 releasing tracks indicated in the syncio CR bitmap 508, the syncio CR bitmap 508 is merged with the standard CR bitmap 506 to use for copying of the next consistency group.

Therefore, FIG. 1-7 illustrate certain embodiments in which by using a syncio out of synchronization bitmap 128 and/or a syncio change recording bitmap 508, contention is reduced when a syncio process 124 executes during the execution of processes for copy operations between a primary storage controller 102 and a secondary storage controller 114.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
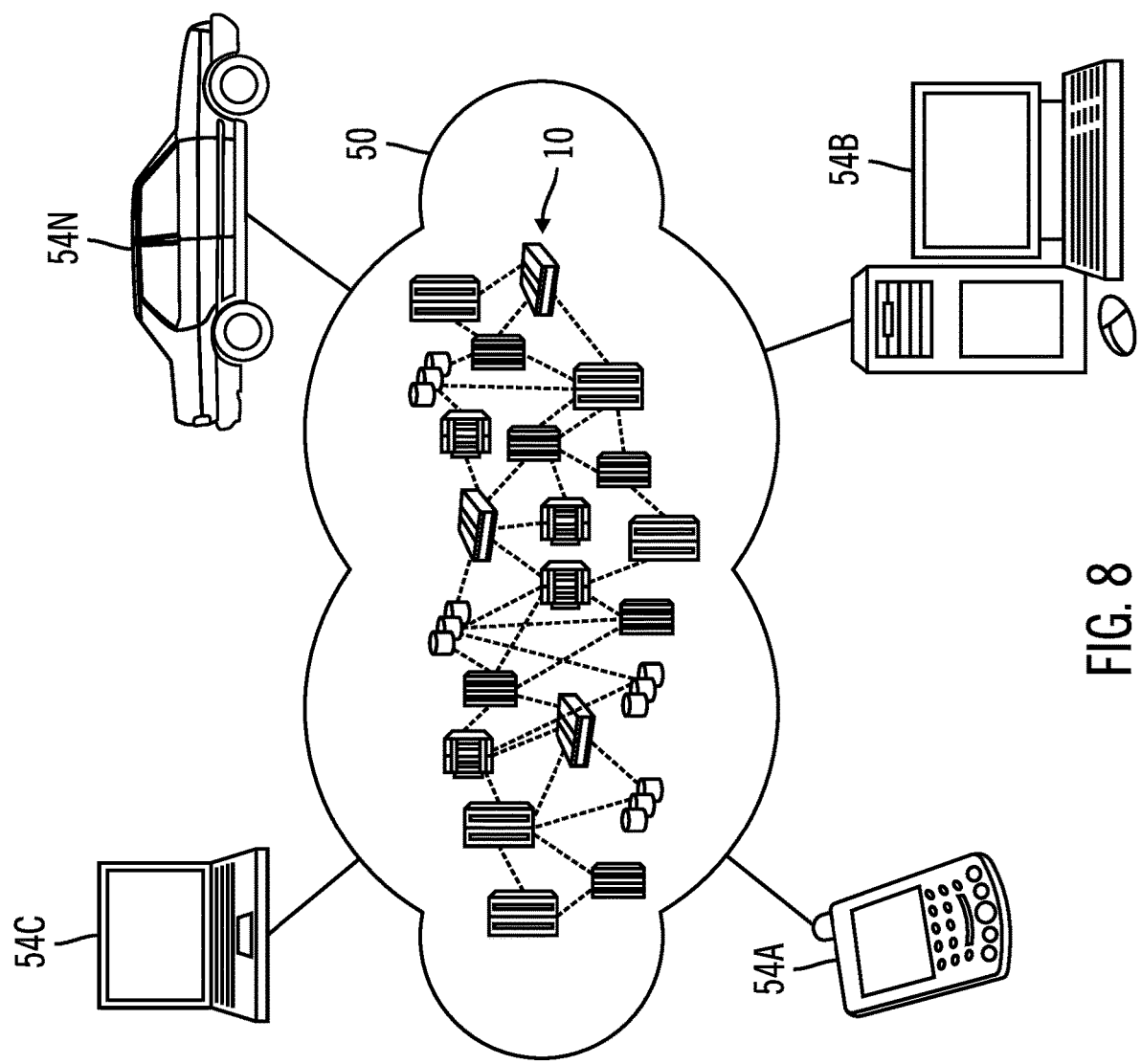
FIG. 8 illustrates a block diagram of a cloud computing environment, in accordance with certain embodiments.

Referring now to FIG. 8 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
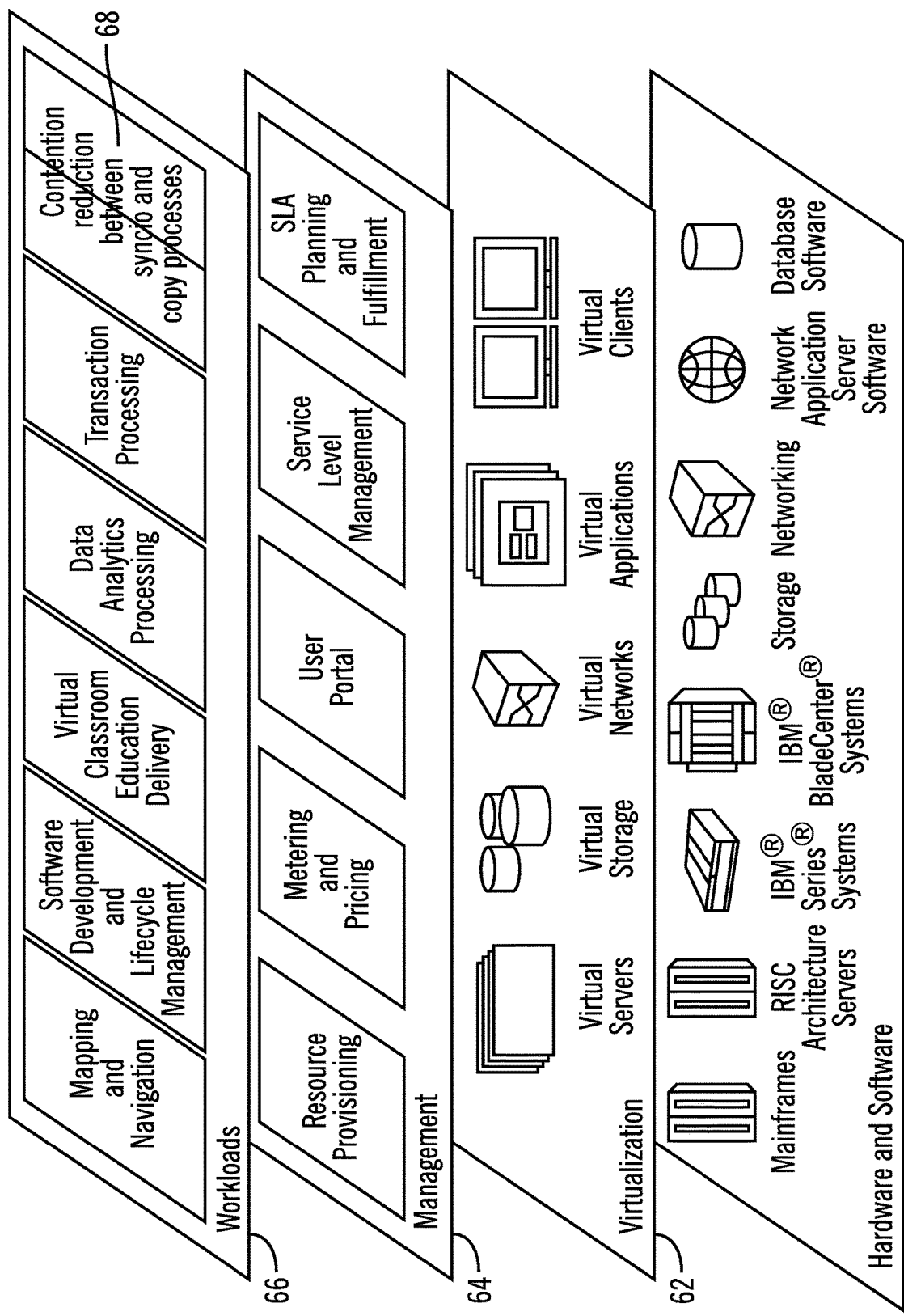
FIG. 9 illustrates a block diagram of further details of the cloud computing environment of FIG. 8, in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and contention reduction between syncio and copy processes 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
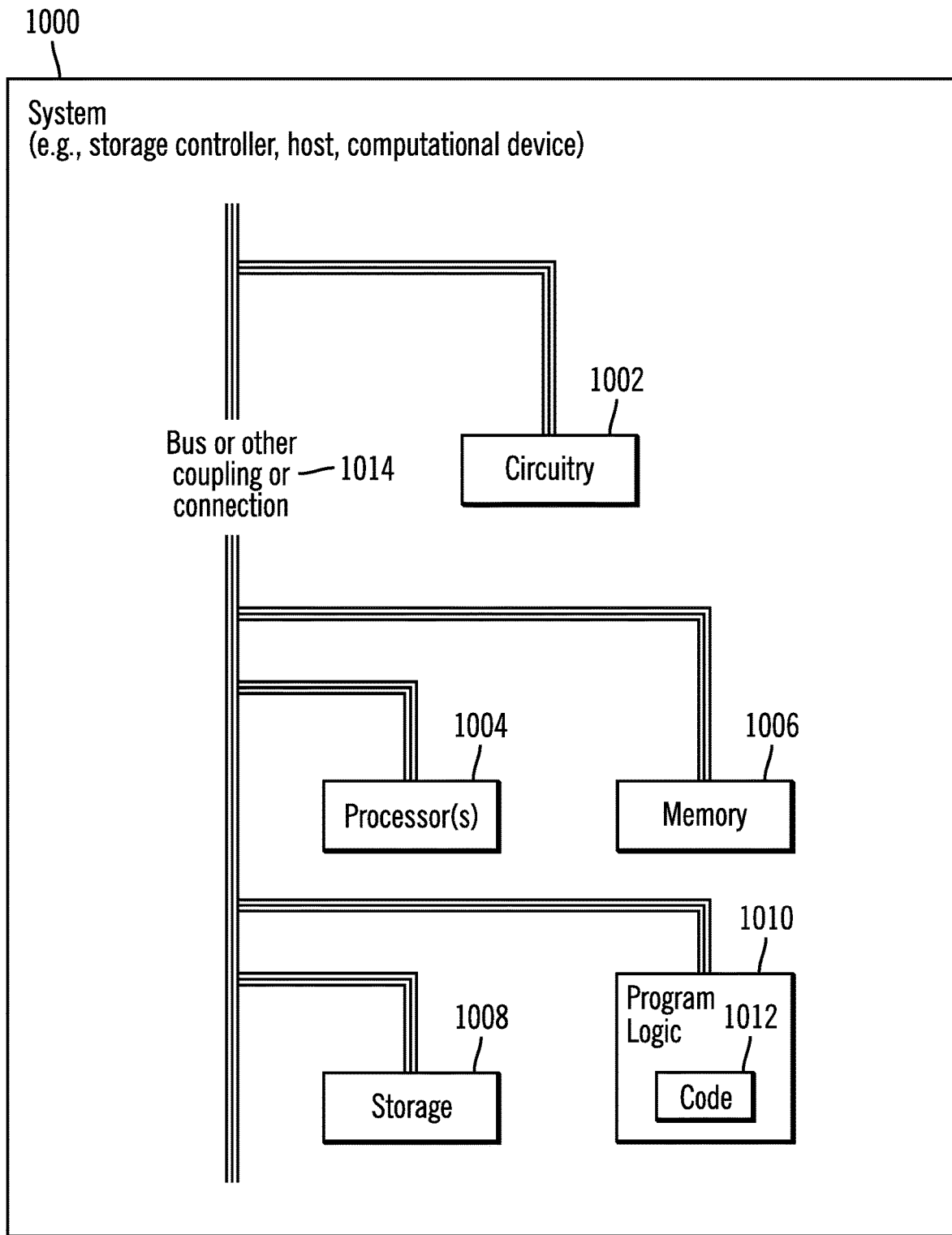
FIG. 10 illustrates a block diagram of a computational system that shows certain elements that may be included in the storage controllers or the host, as described in FIGS. 1-9, in accordance with certain embodiments.

FIG. 10 illustrates a block diagram that shows certain elements that may be included in the primary storage controller 102, the secondary storage controller 114, the hosts 104, or other computational devices in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

performing synchronization of data via remote copy operations from a primary storage controller to a secondary storage controller, wherein input/output (I/O) requests are received at the primary storage controller from a host both via a bus interface and a network interface while the remote copy operations are in progress;

storing in a first data structure identification of tracks written via the network interface that are to be copied from the primary storage controller to the secondary storage controller for the synchronization of data; and storing in a second data structure identification of tracks written via the bus interface that are to be copied from the primary storage controller to the secondary storage controller for the synchronization of data, wherein a process is used to perform writes via the bus interface, wherein the process allows the host to hold an application thread in a spin loop waiting for a write operation to complete, and wherein the process reserves tracks for performing the writes for a greater duration of time prior to performing the writes on the tracks in comparison to other processes that perform writes on the tracks via the network interface.

2. The method of claim 1, wherein the second data structure identifies tracks reserved by the process that is used to perform writes via the bus interface.

3. The method of claim 2, wherein operations for the synchronization of data are initially performed to copy tracks from the primary storage controller to the secondary storage controller by using the first data structure without considering the second data structure.

4. The method of claim 3, the method further comprising:

in response to determining that the process has released the tracks identified in the second data structure, copying the second data structure to the first data structure and then completing the synchronization of data by using the first data structure.

5. The method of claim 1, wherein the first data structure is a standard out of synchronization bitmap.

6. The method of claim 1, wherein the remote copy operations are performed in a mirroring process.

7. A system, comprising:

a memory; and a processor coupled to the memory, wherein the processor performs operations, the operations performed by the processor comprising:

performing synchronization of data via remote copy operations from a primary storage controller to a secondary storage controller, wherein input/output (I/O) requests are received at the primary storage controller from a host both via a bus interface and a network interface while the remote copy operations are in progress;

storing in a first data structure identification of tracks written via the network interface that are to be copied from the primary storage controller to the secondary storage controller for the synchronization of data; and storing in a second data structure identification of tracks written via the bus interface that are to be copied from the primary storage controller to the secondary storage controller for the synchronization of data, wherein a process is used to perform writes via the bus interface, wherein the process allows the host to hold an application thread in a spin loop waiting for a write operation to complete, and wherein the process reserves tracks for performing the writes for a greater duration of time prior to performing the writes on the tracks in comparison to other processes that perform writes on the tracks via the network interface.

8. The system of claim 7, wherein the second data structure identifies tracks reserved by the process that is used to perform writes via the bus interface.

9. The system of claim 8, wherein operations for the synchronization of data are initially performed to copy tracks from the primary storage controller to the secondary storage controller by using the first data structure without considering the second data structure.

10. The system of claim 9, the operations further comprising:

in response to determining that the process has released the tracks identified in the second data structure, copying the second data structure to the first data structure and then completing the synchronization of data by using the first data structure.

11. The system of claim 7, wherein the first data structure is a standard out of synchronization bitmap.

12. The system of claim 7, wherein the remote copy operations are performed in a mirroring process.

13. A computer program product, the computer program product comprising a computer readable storage medium having computer readable program code embodied therewith, the computer readable program code configured to perform operations, the operations comprising:

performing synchronization of data via remote copy operations from a primary storage controller to a secondary storage controller, wherein input/output (I/O) requests are received at the primary storage controller from a host both via a bus interface and a network interface while the remote copy operations are in progress;

storing in a first data structure identification of tracks written via the network interface that are to be copied from the primary storage controller to the secondary storage controller for the synchronization of data; and storing in a second data structure identification of tracks written via the bus interface that are to be copied from the primary storage controller to the secondary storage controller for the synchronization of data, wherein a process is used to perform writes via the bus interface, wherein the process allows the host to hold an application thread in a spin loop waiting for a write operation to complete, and wherein the process reserves tracks for performing the writes for a greater duration of time prior to performing the writes on the tracks in comparison to other processes that perform writes on the tracks via the network interface.

14. The computer program product of claim 13, wherein the second data structure identifies tracks reserved by the process that is used to perform writes via the bus interface.

15. The computer program product of claim 14, wherein operations for the synchronization of data are initially performed to copy tracks from the primary storage controller to the secondary storage controller by using the first data structure without considering the second data structure.

16. The computer program product of claim 15, the operations further comprising:
in response to determining that the process has released the tracks identified in the second data structure, copying the second data structure to the first data structure and then completing the synchronization of data by using the first data structure.

17. The computer program product of claim 13, wherein the first data structure is a standard out of synchronization bitmap.

18. The computer program product of claim 13, wherein the remote copy operations are performed in a mirroring process.

19. A primary storage controller, comprising:
a memory; and
a processor coupled to the memory, wherein the processor performs operations, the operations performed by the processor comprising:
performing synchronization of data via remote copy operations from the primary storage controller to a secondary storage controller, wherein input/output (I/O) requests are received at the primary storage controller from a host both via a bus interface and a network interface while the remote copy operations are in progress;
storing in a first data structure identification of tracks written via the network interface that are to be copied from the primary storage controller to the secondary storage controller for the synchronization of data; and
storing in a second data structure identification of tracks written via the bus interface that are to be copied from the primary storage controller to the secondary storage controller for the synchronization of data, wherein a process is used to perform writes via the bus interface, wherein the process allows the host to hold an application thread in a spin loop waiting for a write operation to complete, and wherein the process reserves tracks for performing the writes for a greater duration of time prior to performing the writes on the tracks in comparison to other processes that perform writes on the tracks via the network interface.

20. The primary storage controller of claim 19, wherein the second data structure identifies tracks reserved by the process that is used to perform writes via the bus interface.

21. The primary storage controller of claim 20, wherein operations for the synchronization of data are initially performed to copy tracks from the primary storage controller to the secondary storage controller by using the first data structure without considering the second data structure.

22. The primary storage controller of claim 19, the operations further comprising:
in response to determining that the process has released the tracks identified in the second data structure, copying the second data structure to the first data structure and then completing the synchronization of data by using the first data structure.

23. The primary storage controller of claim 19, wherein the first data structure is a standard out of synchronization bitmap.

24. The primary storage controller of claim 19, wherein the remote copy operations are performed in a mirroring process.

* * * * *